Jan. 8, 1963  J. A. SCHLARB  3,072,513
FILAMENTOUS MAT AND METHOD FOR MAKING SAME
Filed March 30, 1960  2 Sheets-Sheet 1

INVENTOR.
JAMES A SCHLARB
BY
Edward C. Arenz
ATTORNEY

Jan. 8, 1963   J. A. SCHLARB   3,072,513
FILAMENTOUS MAT AND METHOD FOR MAKING SAME
Filed March 30, 1960   2 Sheets-Sheet 2

*INVENTOR.*
JAMES A. SCHLARB
BY
*Edward C. Areny*
ATTORNEY

United States Patent Office 3,072,513
Patented Jan. 8, 1963

3,072,513
FILAMENTOUS MAT AND METHOD FOR
MAKING SAME
James A. Schlarb, Louisville, Ky., assignor to American
Air Filter Company, Inc., Louisville, Ky., a corporation of Delaware
Filed Mar. 30, 1960, Ser. No. 18,674
9 Claims. (Cl. 154—54)

This invention relates to a method of making glass fiber filamentous mats of the type used for reinforcing and decorative purposes in plastic material.

Glass fiber flat mats adapted for such use may be made by various methods including the methods disclosed in Jackson U.S. patent application Serial No. 621,907, filed November 13, 1956, now Patent No. 3,036,946, and Beckner U.S. patent application Serial No. 822,846, filed June 25, 1959. In both the Jackson and Beckner processes, the following common steps are practiced: reciprocating a glass filament feeder axially along and between the ends of the drum; rotoating the drum a multiplicity of times during each traverse of the feeder; feeding a plurality of individual, or individual and collected, continuous filaments from the feeder to the drum during successive traverses to build up or wind a cylindrical condensed mat having a corresponding succession of layers, each layer containing a multiplicity of continuous helical turns of a single filament, or single and collected filaments; slitting the cylindrical condensed mat axially to remove it from the drum and then laying it flat to provide a planar condensed mat; stretching the condensed mat axially to provide an elongate expanded thickness web; applying a binder to and compressing the thickness of the elongate web to provide an elongate flat web; and treating the flat web to set or cure the binder and form the finished mat material.

The finished mat material formed by either of these processes possesses certain desirable ornamental and structural characteristics such as mat integrity and tensile strength, and which are derived, in part at least, from the relatively long filaments of which the mat is formed. However, such a mat is not entirely suitable for certain molding operations such as, for example, hand lay-up molding, since a mat containing all relatively long substantially unbroken fibers will neither readily conform to the mold, nor remain in its molded position upon the release of whatever forming pressure is used.

Thus one object of the present invention is the provision of a method for fabricating a filamentous flat mat having properties desirable in connection with certain molding operations.

Another object is the provision of a method for fabricating a mat containing fibers of relatively short random lengths distributed throughout the mat so that it possesses sufficient "give" to suit it for hand lay-up molding, but which also contains enough relatively long fibers so that the mat has integrity and is easily handled.

Still another object is the provision of a method which may be readily practiced with existing apparatus and utilizing known glass fiber spinning techniques.

Still other objects of the invention will be appreciated from the following description taken in connection with the accompanying drawing illustrating the principles of the invention by way of example and wherein.

Figure 1:
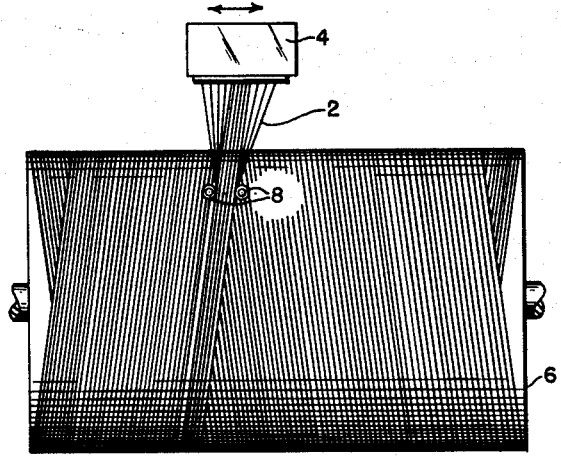
FIGURE 1 is a somewhat diagrammatic front elevational view of winding apparatus shown winding one form of cylindrical condensed mat adapted for use in carrying out the invention.

Referring to the drawing, a cylindrical condensed mat to be used in carrying out the invention is made by feeding a plurality of glass fiber filaments 2 issuing from a glass furnace 4 onto the surface of a rotating drum 6. The furnace 4, and the fiber grouping means or feeder 8 arranged intermediate the furnace and drum, are driven in a reciprocating path axially along, and back and forth between the ends of the drum. The driving means (not shown) for effecting such repciprocating movement is preferably of the type disclosed in Jackson U.S. Patent 2,798,531, and which provides a furnace-feeder traversing speed which is varied in a cyclically repetitive pattern between maximum and minimum values one or more times during each traverse. The drum is rotated a multiplicity of times during each traverse of the furnace-feeder assembly so that the successive layers of condensed mat built up on the drum during corresponding successive traverses will each contain a multiplicity of helical turns of filaments extending continuously from one end of the drum to the other end. It will be appreciated that with this arrangement, the filaments of adjacent layers of condensed mat lie in crossing relationship.

Figure 2:
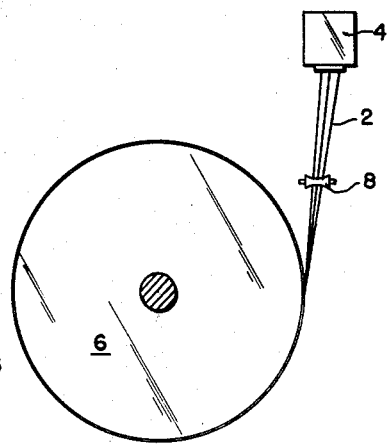
FIGURE 2 is a somewhat diagrammatic side elevational view of the apparatus of FIGURE 1.

The fiber gathering means 8 gathers some of the individual fibers issuing from the furnace 4 into several ribbons of relatively closely spaced fibers for deposition on the drum as a group of closely spaced fibers. The apparatus diagrammatically illustrated in FIGURES 1 and 2 well serves this purpose, but it is to be understood that, in accordance with the desired character and structure of the final mat, other apparatus such as disclosed in the noted Jackson application Serial No. 621,907 may be used; or, alternatively, the apparatus of FIGURES 1 and 2 may be modified to include the provision of means for feeding collected fiber cords or strands from other sources onto the drum simultaneously with those filaments shown. It is also noted that the cylindrical condensed mat may be built up in its entirety of individual fibers, although it has been found that some fiber groups are normally desirable.

Figure 3:
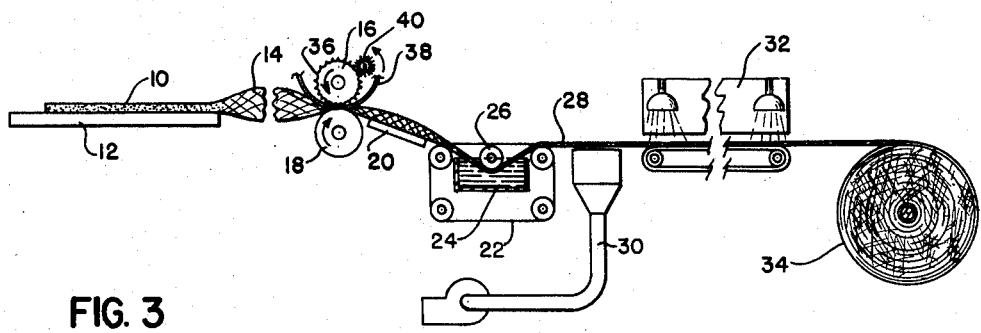
FIGURE 3 is a diagrammatic side elevational view, partly in section, of apparatus suitable for processing a condensed mat in accordance with the principles of the invention.
Figure 4:
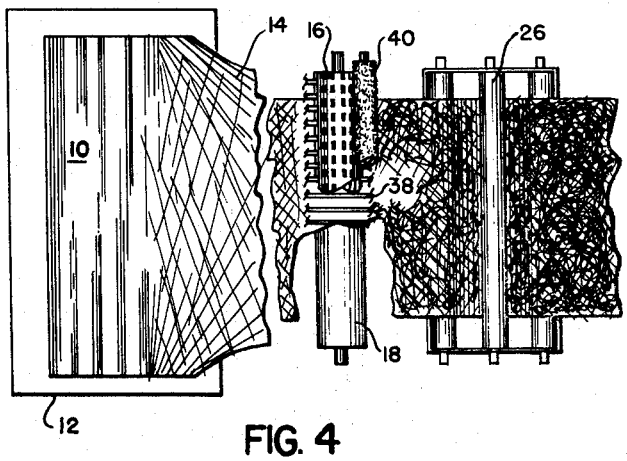
FIGURE 4 is a partly broken, somewhat diagrammatic top view of a part of the apparatus shown in FIGURE 3.

The completed cylindrical condensed mat built up on the drum is slit axially, removed from the drum and laid upon a flat surface to form the planar condensed mat 10 of FIGURES 3 and 4. This planar condensed mat is suitably supported on a table 12 and is then stretched or elongated in a direction transverse to the general lay of the filaments to form an expanded thickness web 14 of substantially reduced width relative to the original length of the planar condensed mat. This stretching or expansion step also causes the fibers to assume an orientation in which nearly all of the fibers have a diagonal disposition of one degree or another and with many of the fibers having varying degrees of corrugation or waviness, as has been attempted to be illustrated in FIGURE 3.

This expanded thickness web 14 is drawn between and passed through a pair of superposed mat piercing rollers including upper toothed roller 16 and lower smooth roller 18, and is then directed downwardly over the flat inclined support 20 onto an endless conveyor 22 which carries the web down into a bath 24 of binder liquid such as a polyester emulsion. As illustrated in FIGURE 3, the pierced web partially re-expands in thickness after leaving the piercing rollers and before entering the bath where it is again flattened and caused to be immersed in the binder by a flattening roller 26. It is passed upwardly from the bath and emerges in the form of a flat pierced mat 28 carrying an excess of binder which is removed by passing the mat over a suction device 30. The mat is then passed through a heat treating oven 32 wherein the binder is cured and the finished pierced flat mat material is then wound into a suitable roll 34 for later use.

The apparatus for piercing the expanded thickness web 14 includes, as noted, an upper toothed roller 16 and a lower smooth roller 18. The upper roller 16 is provided with spaced teeth 36 which extend in axial rows along the roller and also extend in circumferential rows around the roller. The axial spacing of the circumferential rows of teeth permits flat metal bands 38, suitably supported at each end, to be disposed in downwardly bowed fashion through the gap between the axially spaced circumferential rows of teeth so that "licking" of fibers on the upper roller will be prevented as the pierced web leaves the rollers. These metal bands 38 are mounted under very slight tension so that they remain in the spaces between the axially spaced rows of teeth.

The rollers 16 and 18 are rotatably driven in the direction indicated by the arrows in FIGURE 3, and at a speed providing a peripheral velocity corresponding to the velocity of the subsequent conveyors receiving the pierced web. An elongate wire brush roller 40 may be mounted adjacent the first quadrant of the toothed roller 16 (as viewed in FIGURE 3), and rotated in the direction indicated to wipe from the upper roller any stray filaments which may escape the bands 38 and be licked thereonto. Alternatively, this brushing of the upper roller may be done manually by an operator.

Figure 5:
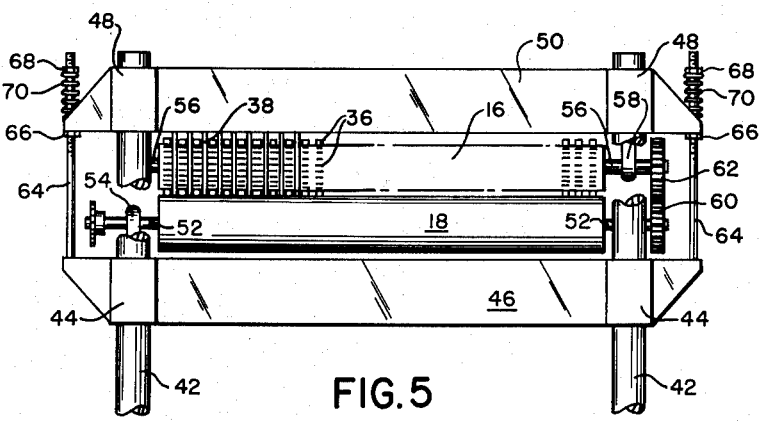
FIGURE 5 is a partly broken front elevational view of one form of fiber severing or piercing apparatus suitable for carrying out the invention.
Figure 6:
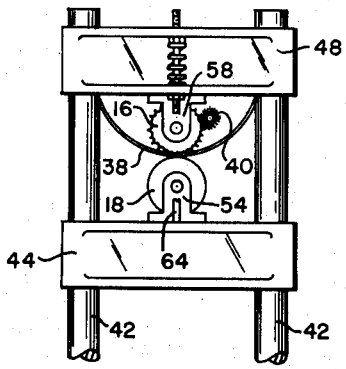
FIGURE 6 is a side elevational view, with certain parts deleted for clarity, of the apparatus of FIGURE 5.
Figure 7:
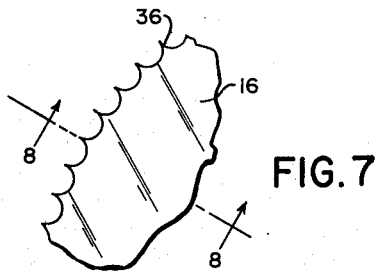
FIGURE 7 is a fragmentary detail view of an end of the upper roller of the piercing apparatus.

Details of the web piercing apparatus diagrammatically illustrated in FIGURES 3 and 4 will now be described in connection with FIGURES 5–7. The apparatus is supported on four columns 42 which carry the lower end castings 44 and lower cross channels 46 in fixed relation thereto, and which provide lateral alignment for the floating upper section comprising upper end castings 48 and upper cross channels 50. The lower smooth roller 18 is supported by stub shafts 52 projecting from each end of the roller and journalled in a pair of pillow blocks 54 mounted on the respective lower end castings 44.

The upper roller 16 is also rotatably supported by its end stub shafts 56 journalled in another pair of inverted pillow blocks 58 fixed to depend from the upper end castings 48. The right hand end stub shafts 52 and 56 of the lower and upper rollers (as viewed in FIGURE 5) each carry an external contact spur gear 60 and 62 respectively for transmitting rotational power delivered to the lower driven roller to the upper idler roller. The lower roller may be driven by any suitable means (not shown).

The upper section is supported at a predetermined minimum distance from the lower section by a pair of vertically disposed rods 64 fixed at their lower ends to the lower end castings 44 and extending upwardly with threaded portions projecting through the upper end castings 48. A lower nut 66 is positioned so that the extremity of the teeth 36 of roller 16 touch or very closely approach the surface of the lower roller 18 as the rollers are rotated. An upper nut 68 on each rod holds a coil spring 70 in compression so that the upper end castings 48 are forced downwardly against the lower nuts 66. By means of this "floating" arrangement, the upper section may be forced upwardly to a greater or lesser extent in accordance with the nature of the web passing through the piercing apparatus.

The bowed metal bands 38 extending downwardly around the upper roller 16 may be supported in any suitable manner at their ends by the upper front and rear channels 50. The elongated wire brush 40 (not shown in FIGURES 5 and 6) may also be supported from the upper section rear channel 50.

It will be noted that, as illustrated in FIGURE 3, the condensed mat 10 increases very substantially in thickness as it is stretched and advanced toward the piercing apparatus, and that the expanded thickness web 14 is of only partially expanded thickness after having passed through the piercing apparatus. This reduction in resiliency of the web results from numerous filaments being severed into random shorter lengths by the apparatus. However, the residual resiliency of the web 14 causes it to re-expand to about half its fully expanded thickness, and through this occurrence some re-orientation or shifting of the filaments occurs so that after the web is again flattened or compressed by the roller 26 in the binder tank (which further shifts the filaments) any piercing pattern is not visually observable. Hence the finished flat mat material has, for all practical purposes, the same appearance as a non-pierced mat material.

Figure 8:
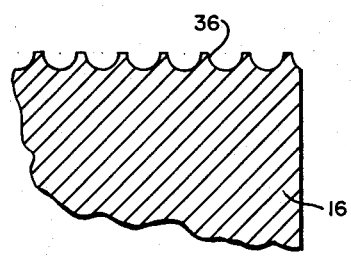
FIGURE 8 is a sectional view taken along the line 8—8 of FIGURE 7.

As will be appreciated, variations in tooth spacing on the roller 16, and in the spinning techniques employed, will result in variations of the structural character and properties of the finished mat. However, for purposes of example, one type of piercing roller 16 which operates satisfactorily is of about a 5½" diameter, has teeth of $\frac{1}{16}$" axial length, ⅛" height and spaced about ¼" apart at the cutting edge. The teeth are spaced approximately ¼" apart around the circumference of the roller, and are shaped generally as illustrated in FIGURES 7 and 8. The spinning technique employed for producing finished reinforcing mats of, say, ¾ to 2 ounces weight per square foot, may, for example, include feeding filaments in grouped and individual form from the traversing furnace-feeder assembly, and simultaneously feeding three collected cords of 100–150 fibers from other sources while rotating the drum approximately 25 times per traverse of the furnace-feeder assembly.

As noted previously, it is preferred that the furnace-feeder assembly speed be varied in a cyclically repetitive pattern between maximum and minimum values one or more times during each traverse. This results in each layer of condensed mat being formed of filaments lying at correspondingly varying angles relative to each other across the width of the condensed mat and, when the condensed mat is stretched axially (i.e., in the direction of condensed mat width), the filaments assume varying diagonal dispositions of the expanded thickness web. In this connection it is noted that those filaments laid onto the drum at greater helical angles will, in the expanded thickness web, generally lie at lesser angles relative to the direction of advance of the expanded thickness web than those laid onto the drum at lesser helical angles. Substantially all of the filaments will, however, extend from one edge of the expanded thickness web to the other edge, with the degree of corrugation or waviness assumed by each filament depending upon the distance spanned by the filament. In other words, those filaments in the expanded thickness web extending at the lesser angles relative to the direction of web advance will be straight or nearly so while those extending more directly across the width of the web must assume some degree of waviness to be accommodated in the width of the web. Keeping in mind that each layer of condensed mat is of such character, and that the varying angularity pattern is slightly offset in adjacent layers in accordance with the preferred practice as disclosed in noted Jackson U.S. Patent 2,798,531, it will be appreciated that each incremental portion of the expanded thickness web passed into the piercing apparatus is composed of a multiplicity of superposed layers of slightly varying character relative to filament angle and corrugation. This results in the filaments being severed along some portion of their length by teeth of two or more successive axially extending rows of teeth while along other portions of their length they are unbroken for, say, 6 to 8 inches or more. The finished mat of the process contains such an extremely high number of filaments that any attempt to classify the distribution of filament length would be impractical to say the least, but a limited examination of small portions of the finished mat indicates the filaments range from about ¼" to 10" in length.

The invention claimed is:

1. In the method of making a filamentous mat of the character described: forming a condensed filamentous planar mat of a series of overlying layers, each layer including generally longitudinally extending, transversely spaced continuous filaments, and with the filaments of adjacent layers lying in crossing relationship; drawing said mat in a transverse direction relative to the general lay of said filaments to simultaneously elongate said mat and expand it in thickness; selectively severing the filaments forming said elongated expanded thickness mat at laterally and longitudinally spaced intervals as said mat is advanced; flattening and applying a binder to said selectively severed mat; and treating said flat mat containing said binder to cure said binder.

2. In the method of making a filamentous mat of the character described: forming a condensed filamentous planar mat of the type having a series of overlying layers with each layer including a plurality of generally longitudinally extending, transversely spaced continuous individual filaments and collected cords of filaments, the individual filaments and collected cords of filaments of adjacent layers lying in crossing relationship; progressively stretching said condensed mat in a direction transverse to the general lay of said filaments and collected cords to substantially attenuate said mat in width relative to the direction of mat advance while coincidentally elongating it and expanding it in thickess; and severing the filaments forming said expanded thickness mat at selected aligned locations spaced uniformly across the width and along the length of said mat; flattening said expanded thickness mat and applying a binder material thereto.

3. In the method of making a filamentous mat of the character described: forming a condensed filamentous planar mat of a series of overlying layers, each layer including generally longitudinally extending, transversely spaced continuous filaments lying in a pattern of varying angularity from one edge to the other edge of said mat, and with the filaments of adjacent layers lying in generally crossing relationship; stretching said mat in a direction transverse to the general lay of said filaments to provide an elongate expanded thickness mat; flattening said expanded thickness mat and simultaneously selectively severing said mat at locations spaced uniformly across the width and along the length thereof to provide a mat including filaments of randomly distributed length; flattening and applying a binder material to said selectively severed mat; and treating said flattened mat containing said binder to cure said binder.

4. The method of making a filamentous mat as specified in claim 3 including the steps of: severing only a minor proportion of the filaments distributed across the width of said elongate mat so that said elongate mat will partially expand in thickness after being severed; and passing said severed mat downwardly to receive said application of said binder, and then upwardly after being flattened.

5. The method of making a filamentous mat as specified in claim 4 including the step: supporting the lower surface of said partially expanded thickness mat as it is passed downwardly to receive said binder.

6. In the method of making a filamentous mat of the character described: forming a condensed filamentous planar mat of the type having a series of overlying layers with each layer including a plurality of generally longitudinally extending, transversely spaced continuous individual filaments and collected cords of filaments, with the filaments and collected cords of each layer lying in a pattern of varying angularity from one edge of said mat to the opposite edge of said mat, and with the filaments of adjacent layers lying in crossing relationship; progressively stretching said condensed mat in a direction transverse to the general lay of said filaments and collected cords to attenuate said mat in width relative to the direction of mat advance while coincidentally elongating and expanding it in thickness; advancing said elongated, expanded thickness mat between flattening and filament severing rollers for simultaneously flattening said mat and severing the filaments forming said mat at laterally and longitudinally spaced locations; flattening and applying a binder material to said mat; treating said flat mat to cure said binder.

7. In the method of making a pierced filamentous mat of the character described: stretching and expanding a condensed filamentous planar mat comprised of layers of filaments lying in crossing relationship relative to the filaments of the adjacent layers in a direction transverse to the general lay of said filaments to form an elongate, expanded thickness web; progressively flattening said web across its width and selectively severing a minor portion of the filaments extending through said flattened width portion; advancing said severed filament web in a partially expanded thickness state into a binder bath; compressing said partially expanded thickness mat while in said binder bath to form a flat mat; and treating said flat mat to cure said binder.

8. A filamentous flat mat comprising a series of overlying layers containing filaments disposed generally diagonally in a pattern of progressively varying angularity with the filaments at one end of the range of angularity being generally straight and the filaments at the other end of the range of angularity having a high degree of corrugation and filaments therebetween having a degree of corrugation corresponding to their degree of angularity and with the filaments of adjacent layers lying in generally crossing relationship, the filaments forming said mat being of random lengths in the range of about ¼ inch to 10 inches.

9. The filamentous flat mat of claim 8 wherein: each layer is composed of a major number of filaments in the form of collected groups and a minor number of individual discrete filaments.

References Cited in the file of this patent

UNITED STATES PATENTS

| 2,202,014 | Lougheed | May 28, 1940 |
| 2,609,320 | Modigliani | Sept. 2, 1952 |
| 2,798,531 | Jackson | July 9, 1957 |